US010215414B2

(12) United States Patent
Martini et al.

(10) Patent No.: US 10,215,414 B2
(45) Date of Patent: Feb. 26, 2019

(54) SYSTEM AND METHOD HAVING FUEL NOZZLE

(71) Applicant: General Electric Company, Schenectady, NY (US)

(72) Inventors: Jeffrey Michael Martini, West Chester, OH (US); Gregory Allen Boardman, West Chester, OH (US); Bassam Sabry Mohammad Abd El-Nabi, Niskayuna, NY (US); Gerardo Antonio Salazar-Lois, West Chester, OH (US)

(73) Assignee: General Electric Company, Schenectady, NY (US)

( * ) Notice: Subject to any disclaimer, the term of this patent is extended or adjusted under 35 U.S.C. 154(b) by 349 days.

(21) Appl. No.: 14/693,838

(22) Filed: Apr. 22, 2015

(65) Prior Publication Data
US 2016/0313007 A1    Oct. 27, 2016

(51) Int. Cl.
F23R 3/28 (2006.01)
F23R 3/14 (2006.01)
F23R 3/04 (2006.01)

(52) U.S. Cl.
CPC ............ *F23R 3/286* (2013.01); *F23R 3/04* (2013.01); *F23R 3/14* (2013.01); *F23R 3/283* (2013.01); *F23R 2900/03044* (2013.01); *F23R 2900/03343* (2013.01); *Y02T 50/675* (2013.01)

(58) Field of Classification Search
CPC .. F23R 3/14; F23R 3/283; F23R 3/286; F23R 3/343; F23R 2900/03343; F02C 7/18; F23D 14/02; F23D 11/102; F23D 2900/14021; F23C 7/004; F05D 2260/201
See application file for complete search history.

(56) References Cited

U.S. PATENT DOCUMENTS

| 5,467,926 | A |   | 11/1995 | Idleman et al. |
| 5,623,827 | A | * | 4/1997  | Monty ............... F23R 3/10 60/747 |
| 5,680,766 | A |   | 10/1997 | Joshi et al. |
| 5,826,423 | A |   | 10/1998 | Lockyer et al. |
| 7,007,477 | B2 |  | 3/2006  | Widener |
| 2010/0162713 | A1 | | 7/2010 | Li et al. |

(Continued)

FOREIGN PATENT DOCUMENTS

EP    2416069 A2    2/2012
EP    2728262 A1    5/2014
(Continued)

OTHER PUBLICATIONS

European Search Report and Opinion issued in connection with corresponding EP Application No. 16166316.6 dated Sep. 13, 2016.

*Primary Examiner* — Todd E Manahan
*Assistant Examiner* — Rene Ford
(74) *Attorney, Agent, or Firm* — Fletcher Yoder, P.C.

(57) ABSTRACT

A gas turbine system include a first body including a central passage extending from a mixing region to a central outlet at a first downstream end portion of the first body, a fuel outlet in the mixing region, an oxidant outlet in the mixing region, and an outer passage including a first passage extending in a downstream direction toward the first downstream end portion and a second passage extending in an upstream direction from the first downstream end portion into the mixing region.

23 Claims, 8 Drawing Sheets

(56) References Cited

U.S. PATENT DOCUMENTS

2012/0031098 A1* 2/2012 Ginessin .................. F23R 3/14
  60/740
2013/0047619 A1 2/2013 Boardman et al.
2014/0060063 A1 3/2014 Boardman et al.

FOREIGN PATENT DOCUMENTS

WO 2013061303 A1 5/2013
WO 2014071063 A1 5/2014

* cited by examiner

SYSTEM AND METHOD HAVING FUEL NOZZLE

BACKGROUND OF THE INVENTION

The subject matter disclosed herein relates to gas turbine engines and, more specifically, to a fuel nozzle assembly of the gas turbine engine.

A gas turbine engine combusts a mixture of fuel and air to generate hot combustion gases, which in turn drive one or more turbine stages. In particular, the hot combustion gases force turbine blades to rotate, thereby driving a shaft to rotate one or more loads, e.g., an electrical generator. The gas turbine engine includes one or more fuel nozzle assemblies to inject fuel and air into a combustor. The design and construction of the fuel nozzle assembly can significantly impact exhaust emissions (e.g., nitrogen oxides, carbon monoxide, etc.) as well as the life of components of the fuel nozzle assembly. Furthermore, the design and construction of the fuel nozzle assembly can significantly affect the time, cost, and complexity of installation, removal, maintenance, and general servicing. Therefore, it would be desirable to improve the design and construction of the fuel nozzle assembly.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a gas turbine system includes a first body including a central passage extending from a mixing region to a central outlet at a first downstream end portion of the first body, a fuel outlet in the mixing region, an oxidant outlet in the mixing region, and an outer passage including a first passage extending in a downstream direction toward the first downstream end portion and a second passage extending in an upstream direction from the first downstream end portion into the mixing region.

In a second embodiment, a gas turbine system includes a fuel nozzle including a first body including a central passage extending from a mixing region to a central outlet at a first downstream end portion of the first body, a plurality of swirl vanes disposed in the mixing region, and an outer passage comprising a first passage extending in a downstream direction toward the first downstream end portion and a second passage extending in an upstream direction from the first downstream end portion into the mixing region, and a second body disposed about the first body. The second body includes a fluid passage extending to a second downstream end portion of the second body.

In a third embodiment, a method includes flowing a first fluid in a downstream direction toward a first downstream end portion of a first body of a fuel nozzle, flowing the first fluid in an upstream direction from the first downstream end portion into a mixing region, mixing the first fluid with a second fluid in the mixing region to generate a mixed fluid. The mixing region includes a plurality of swirl vanes, a fuel outlet, an oxidant outlet, or a combination thereof. The method also includes flowing the mixed fluid from the mixing region through a central passage to a central outlet at the first downstream end portion of the fuel nozzle.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
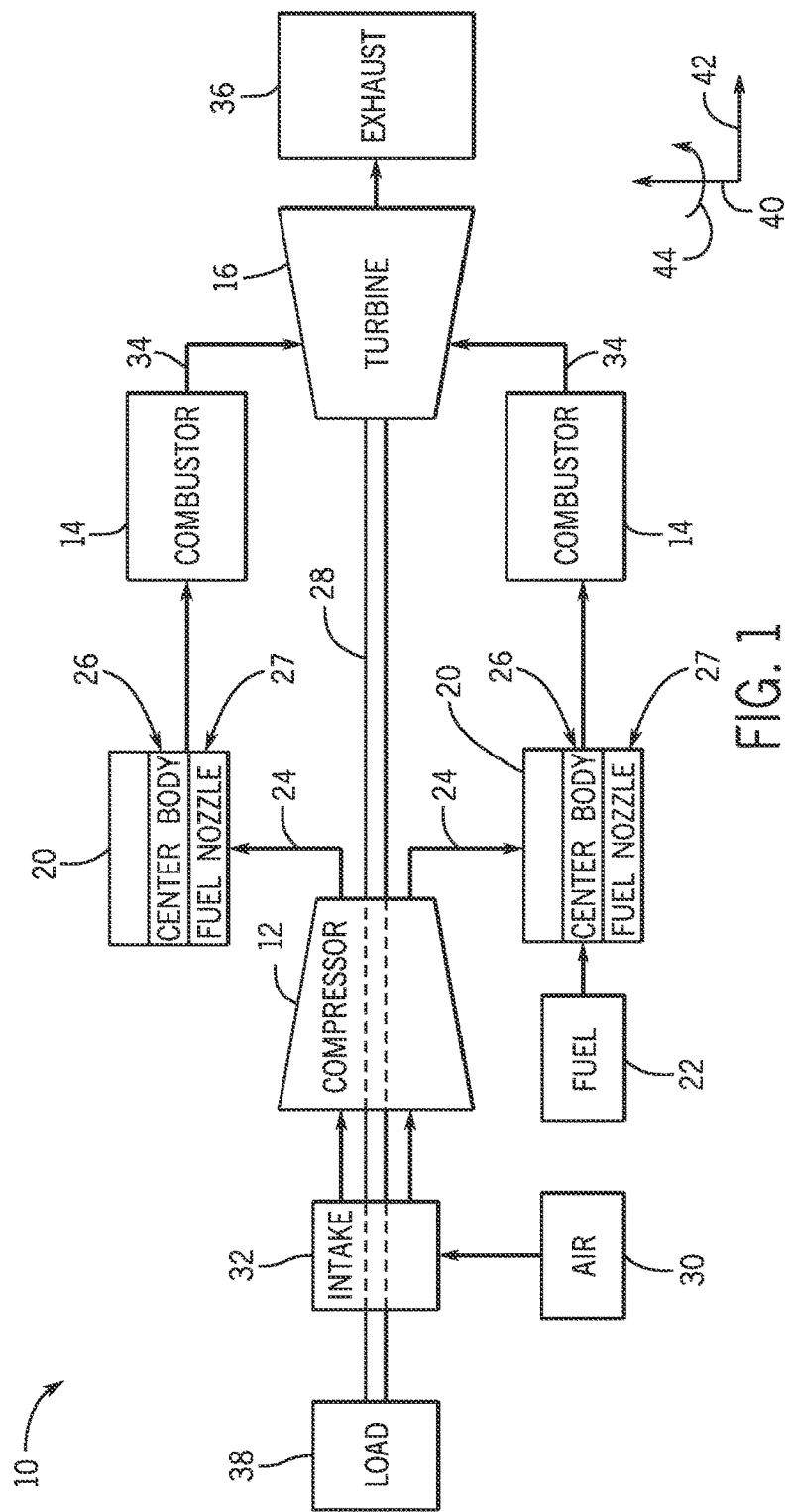
FIG. 1 is a block diagram of an embodiment of a turbine system have a fuel nozzle assembly that includes a central body.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to a fuel nozzle assembly for use in a gas turbine engine. The fuel nozzle assembly provides a mixture of fuel and oxidant (e.g., air) to a combustion region (e.g., a flame region) of a combustor of the gas turbine engine to generate a flame, which in turn generates hot combustion gases. The turbine converts the thermal energy from the flame (e.g., hot combustion gases) to mechanical energy used to provide power to a machine, e.g., an electric generator, pump, etc. The fuel nozzle assembly generally controls the characteristics of the flame (e.g., length, shape, etc.) downstream of the fuel nozzle assembly in the combustion region as well as production of emissions. For example, the fuel nozzle assembly includes a support structure (e.g., a main body) that defines an interior volume for receiving the fuel and an air flow, thereby generating the mixture. The support structure includes a center body that supplies at least a portion of a fuel and air mixture to the combustion region, and stabilizes the flame generated within the combustion region. The fuel nozzle assembly also includes a nozzle shroud coupled to the support structure at a downstream end portion of the fuel nozzle assembly. In certain embodiments, the nozzle shroud may separate a flow of the fuel and air mixture into a plurality of streams spaced apart from one another. For example, the nozzle shroud may include lobes that extend to the downstream end portion of the fuel nozzle assembly, thereby helping to separate the streams as they exit from the fuel nozzle assembly. By separating the fuel and air mixture into multiple streams in the fuel nozzle assembly, a primary flame generated in the combustion region may be separated into a plurality of flames that have a shorter flame length compared to a primary flame generated from a non-segmented fuel and air mixture.

During combustion of the fuel and air mixture, the downstream end portion of the fuel nozzle assembly may be exposed to temperatures ranging from approximately 1000 degrees Celsius (° C.) to more than approximately 2100° C. Such high temperatures may cause thermal stress, wear, and degradation to the fuel nozzle surfaces, thereby increasing maintenance and replacement costs. Cooling methods may be utilized to increase the life of the fuel nozzle assembly by cooling the downstream end portion (e.g., adjacent to the combustion region) of the fuel nozzle assembly. For example, the downstream end portion of the fuel nozzle assembly may be cooled with a cooling fluid (e.g., oxidant such as air, inert gas, steam, fuel, or non-fuel) via film cooling, impingement cooling, or any other suitable cooling technique. In general, the cooling fluid is discharged into the combustion region after cooling. The discharged cooling fluid (e.g., non-fuel such as air) may dilute the fuel and air mixture used to generate the flame in the combustion region, thereby changing a fuel/air ratio of the fuel-air mixture. Additionally, the discharged cooling fluid may quench the fuel-air mixture and change a pressure across the downstream end portion of the fuel nozzle assembly. Consequently, without the disclosed embodiments, the flame may be destabilized, decreasing the efficiency of the system 10 and increasing combustion emissions. Therefore, it may be desirable to recover and use the cooling fluid to generate the fuel-air mixture in a premixing region of the fuel nozzle assembly after cooling the downstream end portion. In this way, fuel/air ratios, temperature, and pressure fluctuations associated with the discharging the cooling fluid directly into the combustion region may be mitigated via the recirculation and premixing. As such, system efficiency may be increased and operative and maintenance costs may be decreased.

FIG. 1 illustrates a block diagram of an embodiment of a turbine system 10. As described in detail below, the disclosed turbine system 10 (e.g., a gas turbine engine) may employ a fuel nozzle assembly, described below, which may improve system durability, operability, and reliability. As shown, the system 10 includes a compressor 12 (e.g., with one or more compression stages), one or more turbine combustors 14, and a turbine 16 (e.g., with one or more turbine stages). The turbine combustor 14 may be an annular combustor extending circumferentially about a rotational axis of the turbine system 10, or the system 10 may include a plurality of combustors 14 circumferentially spaced about the rotational axis. The turbine combustors 14 may include one or more fuel nozzle assemblies 20 configured to receive both fuel 22 and pressurized oxidant 24, such as air, oxygen, oxygen-enriched air, oxygen reduced air, or any combination thereof. Although the following discussion refers to the oxidant as the air 24, any suitable oxidant may be used with the disclosed embodiments. Furthermore, in certain embodiments, one or more fluids (e.g., fuel, steam, inert gas such as nitrogen, exhaust gas recirculation (EGR) gas, or any combination thereof) may be added to the oxidant upstream from the fuel nozzle assemblies 20. The fuel nozzle assemblies 20 route the fuel 22 (e.g., liquid fuel and/or gas fuel, such as natural gas, syngas, or a combination thereof) into the turbine combustors 14. Each fuel nozzle assembly 20 includes a center body 26 having a flow passage that recovers and directs a cooling fluid (e.g., the fuel 22 and/or the air 24) to a mixing region of the fuel nozzle assembly 20, described in further detail below with reference to FIGS. 3-9. For example, the fuel nozzle assembly 20 splits a flow of the air 24 into two streams, one stream flows into a main body vane (e.g., main body air) and the other stream flows into the center body 26 (e.g., center body air). The main body air stream may be between approximately 90% and approximately 98% of the total air 24 flowing through the fuel nozzle assembly 20 (e.g., the air 24 through the main body vane and the center body 26). The center body 26 may also split the center body air 24 between a central purge jet and an internal tip cooling recovery circuit. The center body 26 is disposed within the fuel nozzle assembly 20, surrounded by at least a portion of a fuel nozzle support structure and a nozzle shroud. The center body 26 is configured to split the air 24 into two streams. For example, the center body 26 may direct a first stream of air 24 to a cooling passage fluidly couple to a cooling chamber at a downstream end portion 27 of the fuel nozzle assembly 20, and may direct a second stream of the air 24 to a center purge jet within the center body 26. Additionally, the center body 26 may recover the cooling fluid (e.g., the first stream of the air 24) after cooling the downstream end portion 27, and direct the recovered cooling fluid to a premixing region fluidly coupled to the center pilot. The recovered fluid from the second stream of the air 24 is mixed with the fuel 22 and the first stream of the air 24, thereby generating the fuel-air mixture. Recovering the cooling fluid and directing to the premixing region of the fuel nozzle assembly 20 to generate the fuel-air mixture may mitigate dilution of the fuel-air mixture in the combustor 14. As such, a suitable fuel/air ratio may be maintained, thereby increasing combustion efficiency compared to fuel nozzle assemblies that discharge the cooling fluid directly into the combustor 14. Moreover, pressure and temperature fluctuations across the downstream end portion 27 associated with the discharge of the cooling fluid directly into the combustor 14 may be decreased. Accordingly, the flame generated from the fuel-air mixture in the combustor 14 may be stabilized and combustion emissions may be decreased by premixing upstream.

Compressor blades are included as components of the compressor 12. The blades within the compressor 12 are coupled to a shaft 28, and will rotate as the shaft 28 is driven to rotate by the turbine 16, as described below. The rotation of the blades within the compressor 12 compresses air 30 from an air intake 32 into pressurized air 24. The pressurized air 24 is then fed into the fuel nozzle assembly 20 of the turbine combustors 14. A first portion of the pressurized air 24 (e.g., approximately 2% to approximately 10% of the total fuel nozzle air) may be used to cool the downstream end portion 27 of the fuel nozzle centerbody tip assembly 20 (e.g., via impingement cooling), and recirculated to the premixing region in the center body 26. As such, the cooling fluid (e.g., the pressurized air 24) is not released directly into the combustor 14. Moreover, due to heat absorption from the downstream end portion 27, the recovered fluid (e.g., hot air 24) may pre-heat the fuel 22 in the premixing region. This may increase the overall combustion efficiency of the fuel and air mixture in the combustor 14. A second, small portion of the pressurized air 24 (e.g., approximately 0.1% to approximately 1% of total air 24 through the fuel nozzle assembly 20) may be directed via purge jet to a central mixing region, and premixed with a portion of the fuel 22 and the recovered cooling fluid to generate at least a portion of the fuel-air mixture.

The turbine combustors 14 ignite and combust the fuel-air mixture, and then pass hot pressurized combustion gases 34 (e.g., exhaust) into the turbine 16. Turbine blades are coupled to the shaft 28, which is also coupled to several other components throughout the turbine system 10. As the combustion gases 34 flow against and between the turbine blades in the turbine 16, the turbine 16 is driven into rotation, which causes the shaft 28 to rotate. Eventually, the combustion gases 34 exit the turbine system 10 via an exhaust outlet 36 (e.g., an exhaust conduit). Further, the shaft 28 may be coupled to a load 38, which is powered via rotation of the shaft 28. For example, the load 38 may be any suitable device that may generate power via the rotational output of the turbine system 10, such as an electrical generator, a propeller of an airplane, and so forth.

As discussed above, the center body 26 separates (e.g., segments) a flow of the pressurized air 24 into two flows or streams (e.g., a tip cooling stream and a center pilot stream), and recirculates the recovered cooling fluid (e.g., hot pressurized air 24) to the premixing region. The premixing region is disposed within a central hub of the center body 26.

Figure 2:
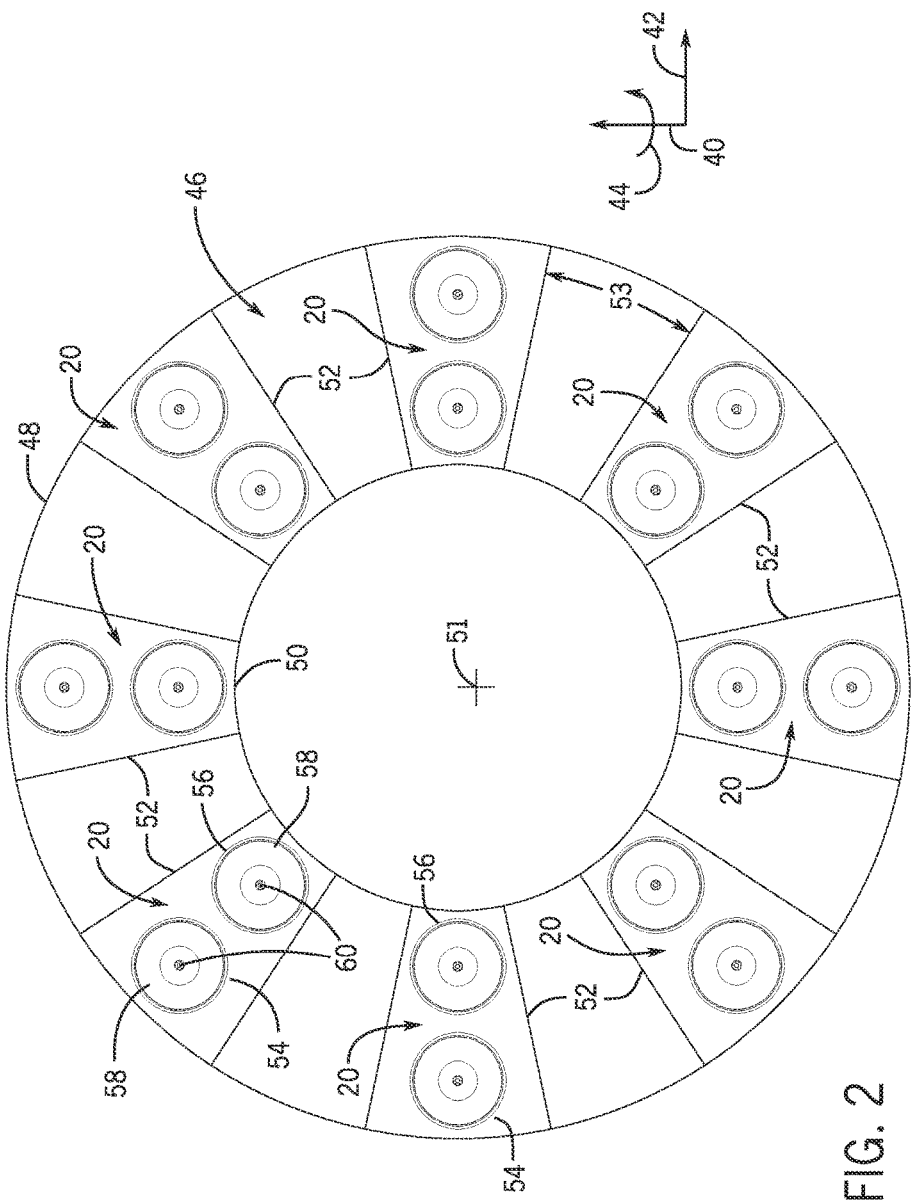
FIG. 2 is a cross-sectional view of an embodiment of a combustor of the turbine system of FIG. 1, wherein the combustor includes multiple fuel nozzle assemblies having the central body.

In the following discussion, reference may be made to an axial axis or direction 40, a radial axis or direction 42, and/or a circumferential axis or direction 44 of the turbine system 10. FIG. 2 is a perspective view of the turbine combustor 14 (e.g., annular combustor) of the system 10 having the one or more fuel nozzle assemblies 20 and the associated center body 26 for supplying the turbine combustors 14 with a mixture of the fuel 22 and the air 24. While the following discussion refers to the turbine combustor 14 as an annular combustor, any other suitable combustor configuration may be used with the fuel nozzle assembly 20. In the illustrated embodiment, the turbine combustor 14 includes an annular region 46 defined by a first combustor boundary 48 (e.g., outer annular wall) and a second combustor boundary 50 (e.g., inner annular wall). The wall 50 (e.g., second combustor boundary) is disposed circumferentially about a rotational axis 51, the region 46 is disposed circumferentially about the wall 50, and the wall 48 (e.g., first combustor boundary) is disposed circumferentially about the region 46 and the wall 50. The turbine combustor 14 includes multiple nozzle stems 52 (e.g., radial protrusions, arms, spokes, or cantilevered members) within the annular region 46. For example, the turbine combustor 14 may include 1, 2, 3, 4, 5, 6, 7, 8, 9, 10, 11, 12, 13, 14, 15, or more nozzle stems 52. Each nozzle stem 52 is circumferentially (e.g., along the circumferential axis 44) spaced apart a distance 53 from an adjacent nozzle stem 52. The nozzle stems 52 may include a mounting structure (e.g., mounting flange) to facilitate coupling, and secure, the nozzle stem 52 to the turbine combustor 14.

The illustrated nozzle stems 52 each include two fuel nozzle assemblies 20. For example, the nozzle stems 52 may include an outer fuel nozzle assembly 54 and an inner fuel nozzle assembly 56. In certain embodiments, the nozzle stems 52 may each include one fuel nozzle assembly 20 or any number of nozzle assemblies 20 (e.g., 1, 2, 3, 4, 5, 6, 7, 8, 9, 10, or more). As discussed above, the fuel nozzle assemblies 20 are configured to route a mixture of the fuel 22 and the air 24 into the combustor region of the turbine combustor 14. For example, the fuel nozzle assemblies 20 direct the fuel-air mixture into the annular region 46 of the turbine combustor 14, where the fuel-air mixture undergoes combustion to generate the thermal energy used to power the turbine 16 and drive one or more machines (e.g., electrical generator, airplane propeller, etc.). The outer and inner fuel nozzle assemblies 54, 56 on each respective nozzle stem 52 may output the same or different type, composition, and/or amount of the fuel 22 and/or the oxidant 24 via a first nozzle opening 58 (e.g., annular opening) and/or first center pilot opening 60. For example, the outer fuel nozzle assembly 54 may output liquid fuel 22 and the inner fuel nozzle assembly 56 may output gas fuel 22 or vice versa. Similarly, the outer fuel nozzle assembly 54 may output air 24 and the inner fuel nozzle assembly 56 may output natural gas and/or syngas (e.g., oxidant 24) or vice versa.

Figure 3:
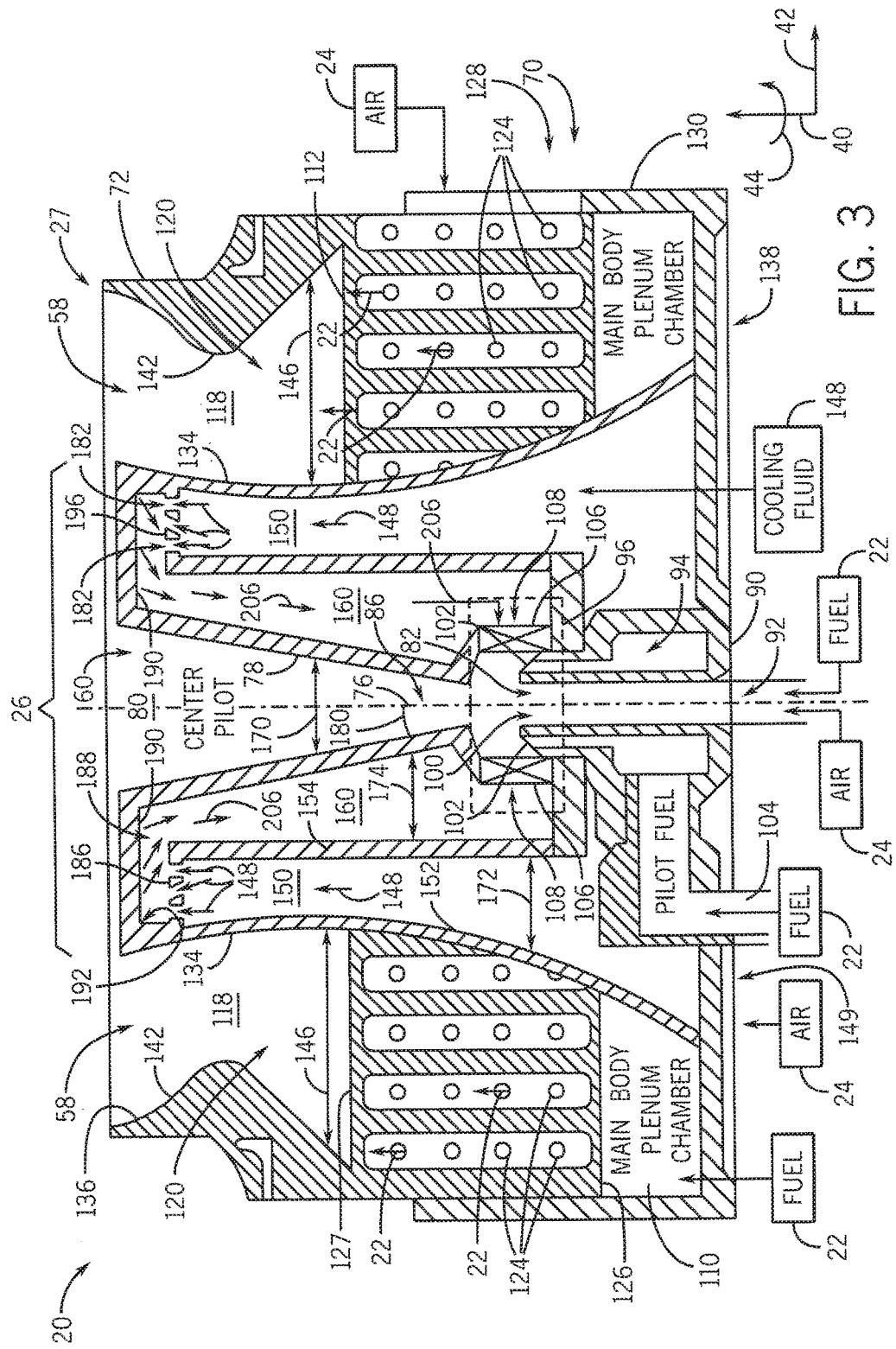
FIG. 3 is a cross-sectional view of an embodiment of the fuel nozzle assembly and center body of FIG. 1, wherein the center body includes a tip cooling passage and a coolant recovery passage fluidly coupled to vanes in a mixing region of the fuel nozzle assembly.
Figure 4:
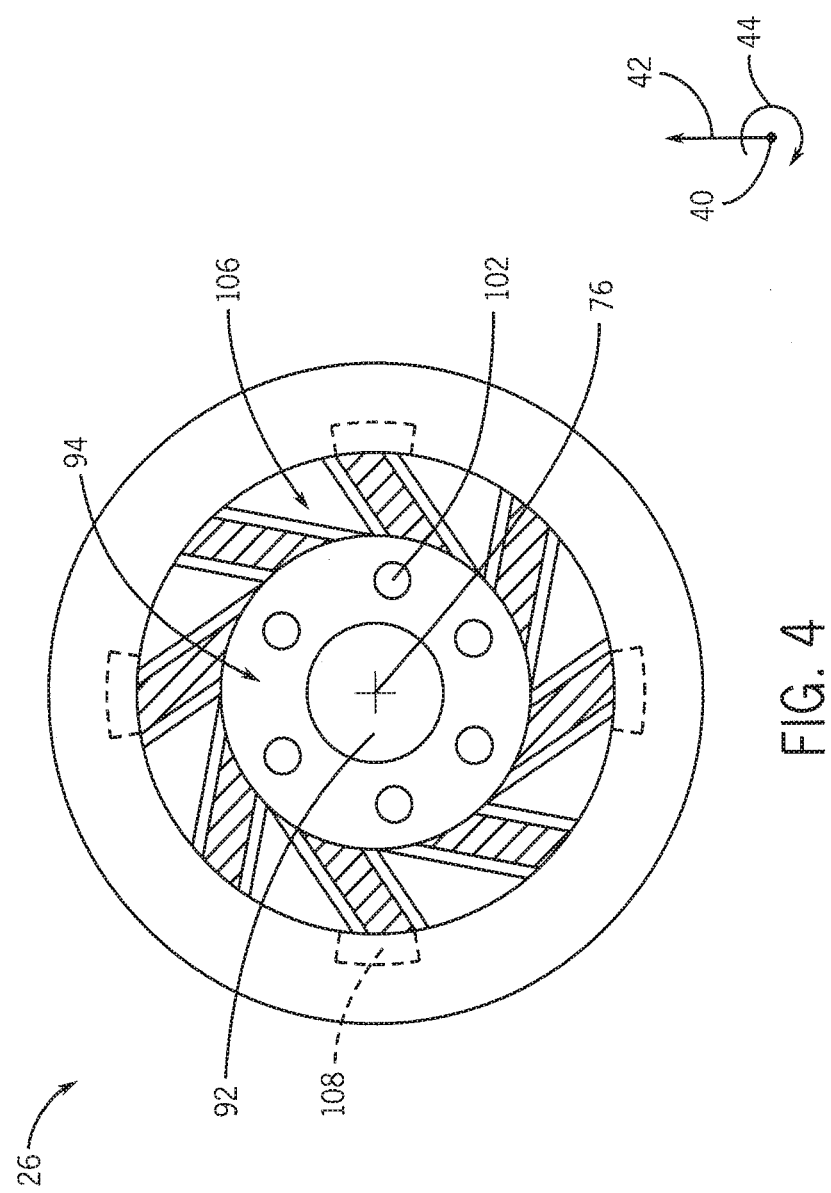
FIG. 4 is a perspective top view of an embodiment of the center body, wherein the center body includes a center pilot, a plurality of fuel openings extending circumferentially about the center pilot, swirl vanes extending circumferentially about the fuel openings, and oxidant outlets extending circumferentially about the swirl vanes.

FIG. 3 is a cross-sectional view of an embodiment of the fuel nozzle assembly 20 that may be used to supply the turbine combustor 14 with the fuel 22 and the air 24. In addition to the center body 26, the fuel nozzle assembly 20 includes a main body 70 (e.g., support structure) and a nozzle shroud 72. A detailed view of the center body 26 is shown in FIGS. 4-8 which are referenced throughout the discussion of FIG. 3. In one embodiment, the main body 70, the nozzle shroud 72, and the center body 26 are separate structures that are removably coupled together, e.g., via removable fasteners, such as bolts, clamps, interference fits, male-female joints, or any combination thereof. The main body 70, the nozzle shroud 72, and the center body 26 each extend circumferentially 44 about an axial axis 76 of the fuel nozzle assembly 20, and may have a generally annular shape. In certain embodiments, each component of the fuel nozzle assembly 20 (e.g., the main body 70, the nozzle shroud 72, and the center body 26) is separable via coupling features. In other embodiments, the main body 70 and the center body 26 are a single structure (e.g., integrally formed as one-piece), and the nozzle shroud 72 is a separate structure that is removably coupled to the single structure (e.g., bodies 26, 70). That is, the bodies 26, 70 are inseparable, and the nozzle shroud 72 is separable (e.g., removable). As should be noted, the main body 70, the nozzle shroud 72, and the center body 26 may be a single structure (e.g., non-separable). The main body 70, the nozzle shroud 72, and the center body 26 may be manufactured via 3-D printing/additive manufacturing techniques, such that the main body 70, the nozzle shroud 72, and the center body 26 are one structure (e.g., not removably coupled) or separate structures (e.g., removably coupled). In embodiments having the nozzle shroud 72 removably coupled to the main body 70, the main body 70 and the nozzle shroud 72 may include coupling features, such as bolts, screws, threaded fasteners, threaded interfaces, interference fits, clamps, male-female joints, or any other suitable coupling mechanism, that facilitate coupling and decoupling of the main body 70 and the nozzle shroud 72. In certain embodiments, the center body 26 may be coupled to the main body 70, the nozzle shroud 72, or a combination thereof, via an interference fit.

The fuel nozzle assembly 20 includes various features that facilitate a flow of the fuel 22 and the air 24 through an interior volume of the fuel nozzle assembly 20 that is defined by the main body 70, the nozzle shroud 72, and the center body 26. For example, the center body 26 includes a center pilot conduit 78 (e.g., central annular wall) defining a center pilot 80 having the first center pilot opening 60 (e.g., axial opening) at the downstream end portion 27 of the fuel nozzle assembly 20, and a second center pilot opening 82 axially 40 upstream from the end portion 27. The conduit 78 (or wall) extends circumferentially 44 about the axial axis 76, thereby defining an axial passage 86 extending axially 40 between the openings 60 and 82. As should be noted, the opening 58 extends circumferentially 44 about the opening 60 and the axis 76.

The second center pilot opening 82 is fluidly coupled to a fuel injector 90 having a first center pilot passage 92 (e.g., conduit) and one or more second center pilot passages 94 (e.g., conduits). The first center pilot passage 92 extends along the axial axis 76, while the one or more second center pilot passages 94 are radially 42 offset from the axial axis 76 (see also detailed view of FIG. 4). In certain embodiments, the passages 92, 94 are coaxial or concentric with one another and/or with the axial axis 76 of the fuel nozzle assembly 20. For example, the second center pilot passage 94 may be disposed circumferentially 44 about the first center pilot passage 92, such that second center pilot 94 forms an annulus around the first center pilot passage 92 (see also FIG. 4). The passages 92, 94 receive at least a portion of the fuel 22 and/or the pressurized air 24 (e.g., from the compressor 12) and supply the fuel 22 and/or the air 24 to a mixing region 96 (e.g., as indicated by dashed box) associated with the center pilot 80, via one or more first and second pilot openings 100, 102 (e.g., axial openings), respectively, which orient the fuel flow in the axial direction 40. For example, a fuel pilot passage 104 is fluidly coupled to the passage 94, and directs at least a portion of the fuel 22 to the mixing region 96 (e.g., via the passage 94). Similarly, a portion (e.g., between approximately 0.1% and approximately 1% of the total fuel nozzle air 24 through the fuel nozzle assembly 20) flows through the passage 92 and into the mixing region 96, where it mixes with the fuel 22 and the recovered cooling fluid, as discussed in further detail below. In certain embodiments, a portion (e.g., between approximately 0.5% and approximately 20%) of the nozzle fuel 22 is mixed (e.g., turbulent mixing) with the air 24 in the passage 92 upstream of the mixing region 96. As should be noted, in certain embodiments, the fuel 22 may flow through the passage 92 and the air 24 may flow through the passage 104.

The first mixing region 96 may include one or more vanes 106 (e.g., swirl vanes or radial swirlers) to facilitate mixing of the fuel 22 and the air 24. For example, the first mixing region 96 may include 1, 2, 3, 4, 5, 6, 7, 8, 9, 10, or more swirl vanes 106 that extend circumferentially 44 about the axis 76 and at least a downstream portion of the passages 92, 94 (see FIG. 4). As discussed in further detail below, the first mixing region 96 also receives additional air 24 (e.g., the recovered cooling fluid) from oxidant outlets 108 (e.g., radial outlets) fluidly coupled to the one or more vanes 106. The oxidant outlets 108 direct a flow of the additional air 24 into the mixing chamber 96 in a radial direction 42, which is oriented crosswise (e.g. perpendicular) relative to a flow of the fuel 22 and the air 24 through the openings 100, 102, respectively. In certain embodiments, the fuel 22 flowing into the mixing region 96 flows between the two streams of the air 24 (e.g., the recovered cooling fluid and the air 24 in the passage 92). That is, the fuel 22 is "sandwiched" between the recovered cooling fluid (e.g., the air 24) and the air 24 from the passage 92. This flow pattern may facilitate mixing the fuel 22 and the air 24 to generate a homogenous fuel-air mixture.

In addition to the fuel injector 90, the fuel nozzle assembly 20 includes a main body plenum chamber 110 (e.g., annular chamber) surrounding (e.g., about the axial axis 76) the center body 26 and/or one or more main body vanes 112 (e.g., 1 to 50 vanes). In certain embodiments, each of the main body vanes 112 may be a swirl vane, such as an axial and/or radial swirl vane, configured to swirl the flow to enhance mixing of fuel and air. The main body plenum chamber 110 and the one or more main body vanes 112 (e.g., 2, 3, 4, 5, 6, 7, 8, 9, 10, or more) are upstream of a mixing chamber 118 disposed in a second mixing region 120 of the fuel nozzle assembly 20. The one or more main body vanes 112 include a plurality of main vane openings 124 (e.g., 1 to 50 per vane) that enable a flow of the air 24 into the mixing chamber 118. The main vane openings 124 may be disposed axially 40 between a leading edge 126 and a trailing edge 127 of each vane 112, directly at or proximate to the trailing edge 127, or any other suitable location. The main body 70 includes a main body opening 128 (e.g., radial opening) on a main body outer wall 130 that supplies a radial flow (e.g., along the radial axis 42) of the air 24 to the one or more main body vanes 112. An axial 40 flow of the fuel 22 from the main body plenum chamber 110 mixes with the air 24 from the one or more main body vanes 112. The main body vanes 112 (e.g., swirl vanes) facilitate mixing of the fuel 22 and the air 24 in the mixing chamber 118.

The fuel 22 in the fuel passage 104 and the main body plenum chamber 110 may be the same or different. For example, in one embodiment, the fuel 22 in the fuel passage 104 may be one type of fuel and the fuel 22 in the main body plenum chamber 110 may be a second type of fuel different from the first type of fuel 22 in the fuel passage 104. For example, the fuels may be different gas fuels, different liquid fuels, or a combination of different gas and liquid fuels. In other embodiments, the type of fuel 22 in both the fuel passage 104 and the main body plenum chamber 110 may be the same. In addition, the fuel 22 in the fuel passage 104 and the main body plenum chamber 110 may be the same or different composition. The multiple fuel injection passages (e.g., the fuel passage 104 and the main body plenum chamber 110) enable the fuel nozzle assembly 20 to use at least two distinct fuels. Again, the fuels may different gas and/or liquid fuels.

In certain embodiments, the fuel nozzle assembly 20 may include additional fuel passages and fuel injection ports fluidly coupled to the mixing chamber 118. The additional fuel passages (e.g., fuel conduits) and ports (e.g., fuel outlets) may provide additional fuel 22 to the mixing chamber 118. In the mixing chamber 118, the fuel 22 from the main body plenum chamber 110 and the air 24 from the one or more main body vanes 112 may mix with additional fuel 22 from the additional fuel passages. The fuel ports (e.g., greater than or equal to 1, 2, 3, 4, 5, 6, 7, 8, 9, 10, 15, 20, 50, or more) may be circumferentially 44 spaced about the axial axis 76 at different axial, radial and circumferential positions, and the fuel ports may be oriented at different angles relative to the axial axis 76 (e.g., parallel, perpendicular, or acutely angled at 10, 20, 30, 40, 50, 60, 70, or 80 degrees).

Figure 10:
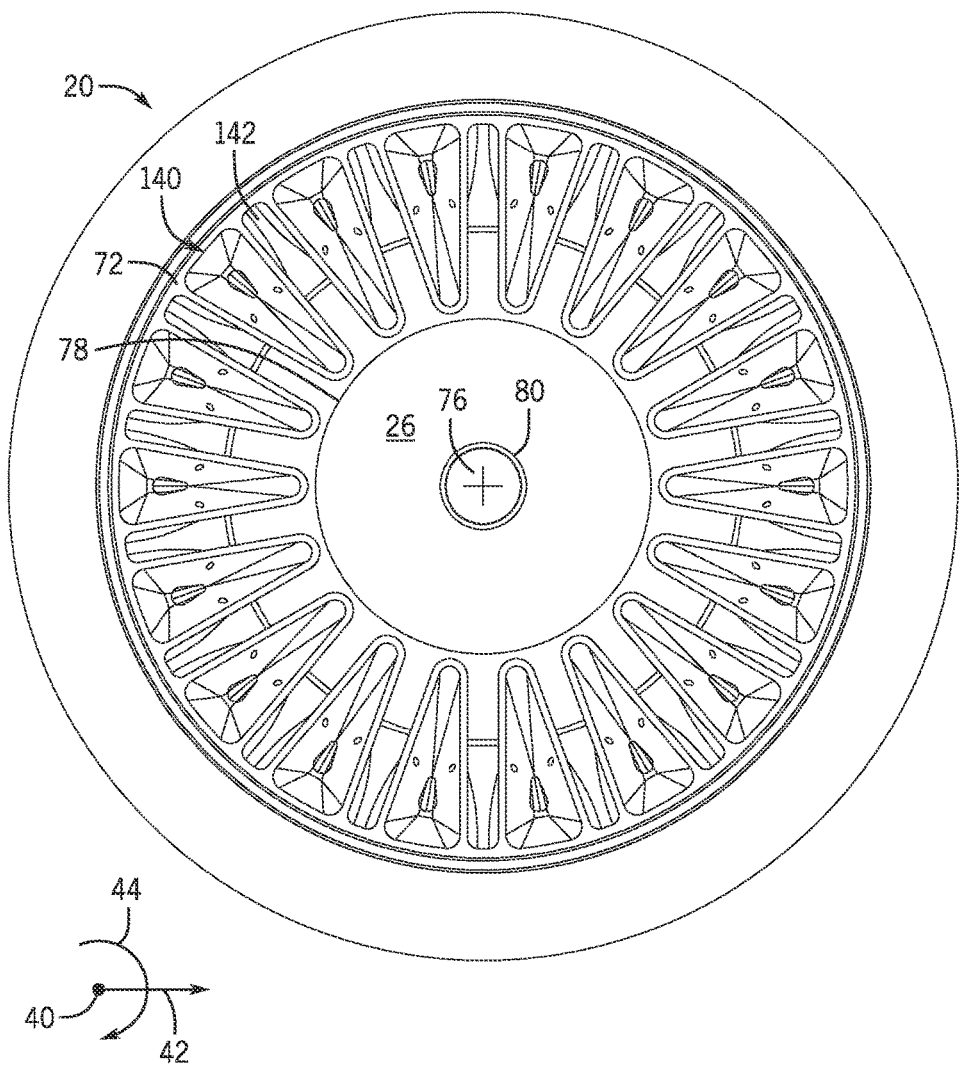
FIG. 10 is a cross-sectional view of an embodiment of a combustor of the turbine system of FIG. 1, wherein the combustor includes multiple fuel nozzle assemblies having lobes.

The mixing chamber 118 is defined by of a portion of a first center body conduit 134 (e.g., wall) and at least a portion of a nozzle shroud wall 136 (e.g., annular wall). The first center body conduit 134 generally extends circumferentially 44 about the axial axis 76 (e.g., an annular wall 134). In certain embodiments, the conduit 134 may gradually diverge (e.g., linearly, non-linearly, curve) radially outward 42 away from the axis 76 in an upstream direction toward an upstream end portion 138. In certain embodiments, the conduit 134 may gradually diverge radially outward 42 away from the axis 76 in a downstream direction toward the first nozzle opening 58. The nozzle shroud wall 136 generally extends circumferentially 44 about the axial axis 76 and at least a portion of the conduit 134 (e.g., an annular wall 136). The mixing chamber 118 is upstream of the opening 58 at the downstream end portion 27. In certain embodiments, the opening 58 may include a plurality of circumferentially 44 spaced lobes 140 that separate (e.g., circumferentially 44 segment) the fuel-air mixture generated in the mixing chamber 118 into discrete flow paths before flowing into the combustion region 46 (e.g., see FIG. 10). For example, the lobes 140 define lobe passages 142 that direct the fuel-air mixture into the combustion region 46. In the illustrated embodiment, a radial dimension 146 of the mixing chamber 118 (e.g., between a portion of the conduit 134 and the nozzle shroud wall 136) decreases in the downstream direction from the trailing edge 127 of the vanes 112 to a protrusion 142 in the wall 136 (e.g., annular protrusion defining an area with a reduced cross-sectional flow area). The reduced cross-sectional flow area may facilitate mixing of the fuel 22 and the air 24 downstream from the vanes 112. For example, the fuel-air flow may experience a convergence in cross-sectional flow area and an associated drop in pressure and increase in fluid velocity, thereby enhancing fuel-air mixing of the flows passing through second mixing region 120. Moreover, the increasing radial dimension 146 downstream of the protrusion 142 (e.g., diverging cross-sectional flow area between the protrusion 142 and the first nozzle opening 58) also may increase the residence time of the fuel-air mixture in the chamber 118, thereby enhancing mixing of the fuel 22 and the air 24 in the second mixing region 120. In certain embodiments, the chamber 118 includes lobes between the first nozzle opening 58 and the trailing edge 27 or protrusion 142, which separate the fuel and air mixture into discrete flow paths before flowing into the combustion region 46. Separating the fuel-air mixture into discrete flow paths may decrease a length of the primary flame by generating a plurality of primary flames having a shorter length compared to a primary flame generated from a non-segmented flow of the fuel and air mixture. As such, emissions generated from combustion of the fuel and air mixture may be reduced for high flame temperatures (e.g., temperatures above 1500° C.) and/or small combustors that have a small reaction zone may be used.

As discussed above, combustion of the fuel and air mixture in the combustion region 46 may result in temperatures in excess of 1000° C. To mitigate degradation of the fuel nozzle assembly 20 caused by the high temperatures, the downstream end portion 27 of the fuel nozzle assembly 20 is cooled with a cooling fluid 148. Without the disclosed embodiments, after cooling the downstream end of a fuel nozzle assembly, the cooling fluid (e.g., the air 24) may be discharged into the combustion region and/or a region of the center pilot 80 adjacent to the first center pilot opening 60. Discharging the cooling fluid into the combustion region 46 and/or adjacent to the first center pilot opening 60 may affect fuel/air ratios and flame stability in the combustion region 46. Moreover, the discharged cooling fluid may cause fluctuations in pressure and temperature across the downstream end portion 27, resulting in a non-uniform flow of the fuel-air mixture into the combustion region 46 and un-even combustion. The fluctuations in the fuel/air ratios, the pressure, and the temperature from cooling fluid discharged directly into the combustion region 46 may destabilize the primary flame, resulting in an increase in emissions (e.g., NOx and CO) and a decrease in the efficiency of the system 10. Therefore, the disclosed embodiments recover and use the cooling fluid to generate the fuel-air mixture (e.g., in the mixing region 96). Additionally, supplying the cooling fluid to the mixing region 96 may preheat the fuel 22, thereby increasing the combustion efficiency of the system 10.

As discussed above, the center body 26 receives a portion of the fuel 22 and the air 24 used to generate the flame in the combustion region 46. The center body 26 separates an axial 40 flow of the air 24 into two separate streams. For example, a first portion of the air 24 (e.g., between approximately 0.1% and approximately 1% of the total flow of air 24 through the fuel nozzle assembly 20, e.g., the center body 26 and the main body 70) may be supplied to the mixing region 96 through the passage 92, and a second portion of the air 24 (e.g., between approximately 2% and approximately 10% of total flow of air 24 through the fuel nozzle assembly 20) may be supplied to a tip cooling passage 150 (e.g. outer passage) via an air inlet 149 (e.g., axial inlet) and used to cool the downstream end portion 27 of the fuel nozzle assembly 20 and supply additional air 24 to the mixing region 96 to generate the fuel-air mixture. Accordingly, the center body 26 includes the tip cooling passage 150 radially 42 offset from the axial axis 76 and the center pilot 80, and defined by at least a portion of the conduit 134, a second center body conduit 152 (e.g., annular wall) that extends axially 40 from the conduit 134, and a third center body conduit 154 (e.g., annular wall). The tip cooling passage 150 may include a plurality of discrete passages spaced circumferentially 44 about the axial axis 76 and/or a common annular passage extending circumferentially 44 about the axial axis 76. In certain embodiments, the tip cooling passage 92 may be coaxial or concentric with the center pilot 80 (e.g., along axial axis 76). The tip cooling passage 150 (e.g., between conduits 134, 152, and 154) circumferentially 44 surrounds at least a portion of the center pilot 80 (e.g., conduit 78) at the downstream end portion 27.

In the illustrated embodiment, the conduit 134 generally extends circumferentially 44 about a first portion of the conduit 154 and the central axis 76. The conduit 152 generally extends circumferentially 44 about a second portion of the conduit 154 (e.g., at an upstream end of the conduit 154) and the axis 76. The conduit 154 generally extends circumferentially 44 about the axis 76 and the conduit 78 (e.g., annular wall 78). The center body 26 also includes a coolant recovery passage 160 (e.g., an inner annular passage). The passage 160 is defined by the conduit 154 and the conduit 78. Therefore, the passage 160 is disposed adjacent to the passage 150 on an opposite side of the conduit 154. As discussed in further detail below, the coolant recovery passage 160 directs a cooling fluid (e.g., the fuel 22, the oxidant 24, or a combination thereof) to the mixing region 96 via the outlets 108.

The passage 150 extends in a downstream direction toward the downstream end portion 27, and the passage 160 extends in an upstream direction from the downstream end portion 27 to the mixing region 96. The passages 150, 160 generally extend circumferentially 44 about the axial axis 76 and the central pilot 80 (e.g., annular passages 150, 160), and the passage 150 generally extends circumferentially 44 about the passage 160. A radial dimension 170 of the central pilot 80 is shown by arrow 170, a radial dimension 172 of the passage 150 is shown by arrow 172 (e.g., between the conduits 134/152, 154), and a radial dimension 174 of the passage 160 is shown by arrow 174 (e.g., between the conduits 78, 154).

Figure 5:
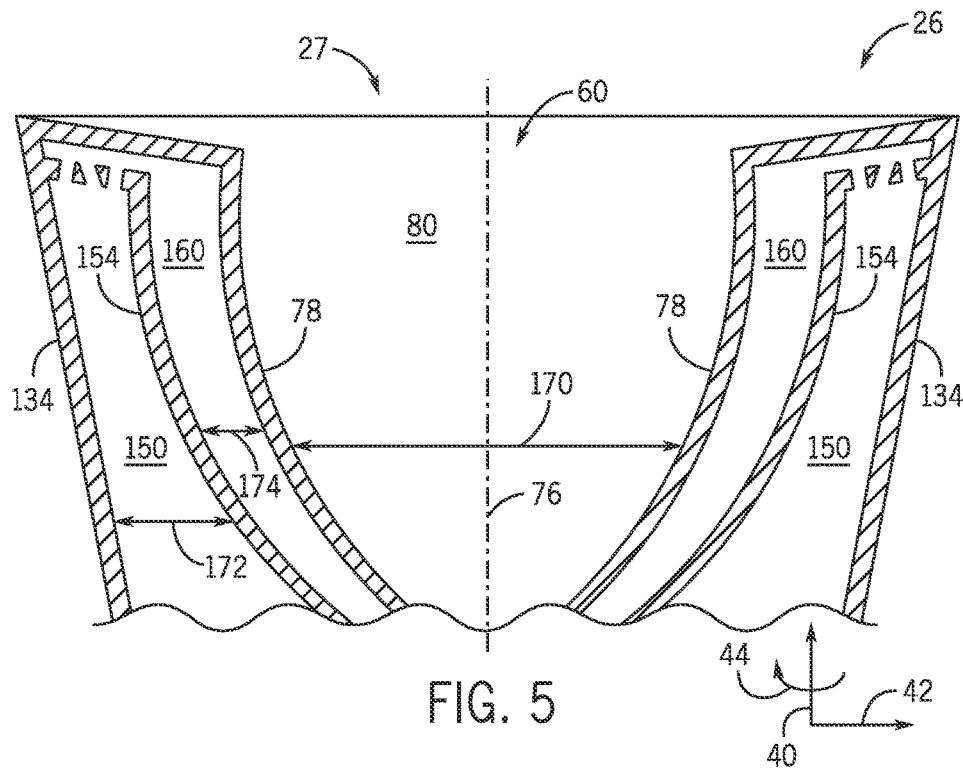
FIG. 5 is a cross-sectional view of an embodiment of the center body, wherein the center body includes conduits that define at least a portion of the coolant recovery passage and a center pilot passage non-linearly increase radially outward away from a centerline axis of the fuel nozzle assembly such that the center pilot and the coolant recovery passage have a globular shape.
Figure 6:
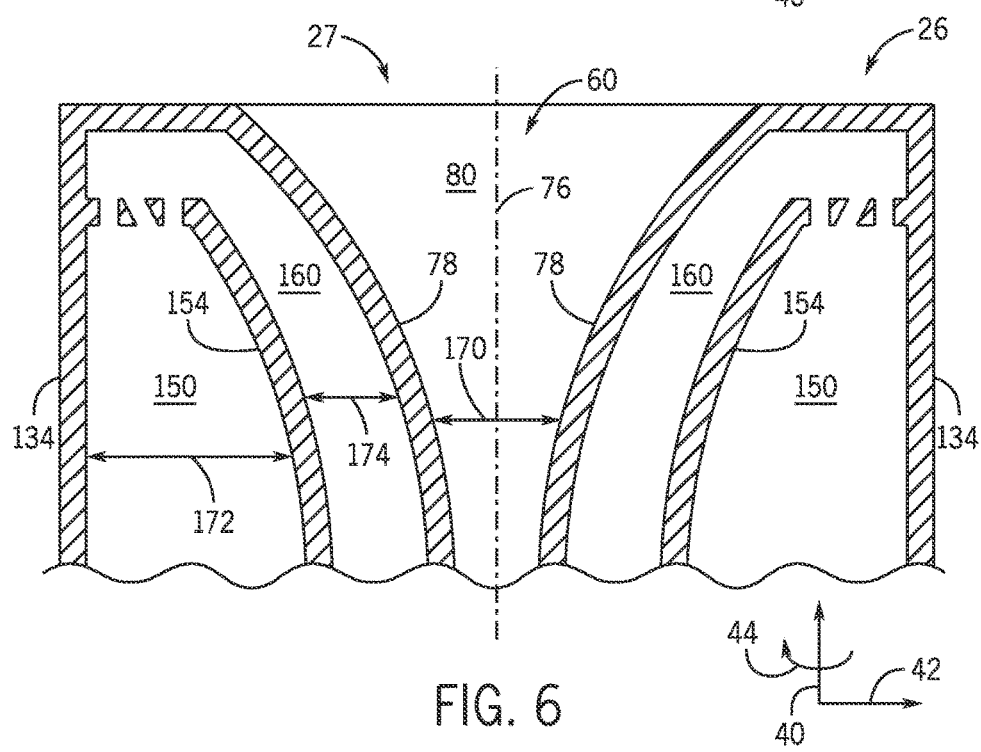
FIG. 6 is a cross-section view of an embodiment of the center body, wherein the center body includes conduits defining at least a portion of the coolant recovery passage and the center pilot passage non-linearly increase radially outward away from the centerline axis of the fuel nozzle assembly such that the center pilot and the coolant recovery passage have a fluted shape.

In certain embodiments, the center pilot 80 and/or the passage 150, 160 may be frustoconical. Accordingly, the radial dimensions 170, 172, and/or 174 associated with the center pilot 80 and passages 150, 160 may be variable and/or constant in the axial direction 40. For example, as illustrated in FIGS. 5 and 6, the conduit 78 associated with the center pilot 80 generally diverges (e.g., linearly, non-linearly, curved) radially outward 42 away from the axial axis 76 in a downstream direction from the mixing region 96 toward the downstream end portion 27, and thus the radial dimension 170 gradually increases (e.g., linearly, non-linearly, or curved) in the downstream direction. The conduit 78 may be any combination of cylindrical, conical, concave, and/or convex shapes. For example, FIGS. 5 and 6 illustrate a non-linear (e.g., curved) increase in the radial dimension 170 of the center pilot 80. As illustrated in FIG. 5, the conduit 78 may be concave such that the center pilot 80 has a globular shape. However, the conduit 78 and the center pilot 80 could be any combination of cylindrical, conical, concave, and/or convex shapes. For example, in other embodiments, the conduit 78 may be convex, and the center pilot 80 may have a fluted shape, as illustrated in FIG. 6. In some embodiments, the radial dimension 170 may decrease and/or remain constant for some axial distance prior to increasing in the downstream direction. As should be noted, in certain embodiments, the conduit 78 may not diverge radially outward away from the axis 76. Rather, the conduit 78 may be coaxial with the axis 76, such that the radial dimension 170 is constant between the mixing region 96 and the pilot opening 60.

The conduits 134/152, 154 may or may not conform to the shape of the central pilot 80. For example, in certain embodiments, at least one of the radial dimensions 172, 174 associated with the passages 150, 160 may change (e.g., decrease or increase) inversely to the radial dimension 170 in the downstream direction. As such, at least one of the walls 134/152, 154 may gradually diverge (e.g., linearly, non-linearly, curved) radially outward 42 away from the axis 76 in the upstream direction toward the upstream end portion 138. As illustrated in FIG. 3, the wall 154 gradually diverges radially outward from the axis 76 in the upstream direction, such that the passage 160 has a gradually increasing radial dimension 174 toward the upstream end portion 138 (e.g., in a direction opposite the increasing radial dimension 170). The radial dimension 172 of the passage 150 may increase in the same or inverse direction as the radial dimension 174. For example, as illustrated in FIG. 3, at least a portion of the wall 134, 152 defining the passage 150 may gradually diverge in the radial direction 42 away from the axis 76 in the downstream direction (e.g., toward the downstream end portion 27). As such, the radial dimension 172 of the passage 150 increases inversely to the radial dimension 174 of the passage 160 in a downstream direction toward the downstream end portion 27. In certain embodiments, the conduits 134, 152 gradually diverge radially outward 42 away from the central axis 76 in the upstream direction. As such, the radial dimension 172 of the passage 160 gradually increases in the same direction as the radial dimension 170 toward the upstream end portion 138.

In other embodiments, at least a portion of the walls 134/152, 154 conform to the shape of the center pilot 80. By way of example, FIGS. 5 and 6 illustrate both the conduits 78, 154 diverging radially outward 42 from the axis 76 in the downstream direction. Accordingly, the radial dimension 174 associated with the passage 160 increases in the same direction as the radial dimension 170 (e.g., toward the downstream end portion 27). In certain embodiments, the radial dimensions 172, 174 of associated with the passages 150, 160 may be constant between the respective conduits 134/152, 154. In other embodiments, the passages 80, 150, 160 may have a variable radial dimension 170, 172, 174 (e.g., gradually increasing and/or decreasing in the downstream direction).

As discussed above, the passages 150, 160 flow the cooling fluid 148 (e.g., the pressurized air 24 in a downstream direction) in a downstream direction toward the downstream end portion 27 and in an upstream direction toward the mixing region 96. The following discussion will refer to the cooling fluid 148 as the air 24. However, in certain embodiments, the cooling fluid 148 may also include the fuel 22, steam, inert gas, or any other suitable fluid and combinations thereof. The passage 150 may flow the cooling fluid 148 in an axial direction 40 toward the downstream end portion 27. As discussed above, the center body 26 segments an axial flow 40 of the air 24 into a tip cooling stream (e.g., through the passage 150) and a center pilot stream (e.g., through the passage 92. For example, between approximately 2% and approximately 10% of the total flow of the air 24 through the fuel nozzle assembly 20 (e.g., the center body 26 and the main body 70) may flow through the passage 150, and between approximately 0.1% and approximately 1% of the total fuel nozzle air 24 may flow through the passage 92. The cooling fluid 148 flows through the tip cooling passage 150 (e.g., between conduits 134/152 and 154) in a downstream direction towards the downstream end portion 27, as illustrated by arrow 148, and cools the downstream end portion 27 of the fuel nozzle assembly 20 (e.g., via film cooling, impingement cooling, or any other suitable cooling technique). For example, in the illustrated embodiment, the cooling fluid 148 flows through one or more axial impingement openings 182 (e.g., 1 to 100) in a perforated cooling plate 186 (e.g., impingement and/or film cooling plate) near the downstream end portion 27 and impinges on an inner surface 190 (e.g., axial end plate) of a cooling chamber 188 (e.g., a radial passage) of the fuel nozzle assembly 20, thereby cooling the inner surface 190. As discussed in further detail below, the cooling chamber 188 fluidly couples the passages 150 and 160 to direct the cooling fluid 148 in the upstream direction to the mixing region 96 after cooling the inner surface 190.

Each impingement opening 182 has a smaller diameter compared to the radial dimension 172 of the cooling passage 150 (e.g., upstream of the impingement openings 182). In this way, a velocity of the cooling fluid 148 flowing through the impingement openings 182 increases, thereby facilitating impingement of the cooling fluid 148 and cooling of the inner surface 190. In general, the cooling fluid 148 flows through the impingement openings 182 in an axial direction 40 toward the inner surface 190. However, the axial flow 40 of the cooling fluid 148 may not reach certain regions of the inner surface 190. For example, based on the position of the impingement openings 182, the cooling fluid 148 may not impinge on an edge 192 (e.g., an edge adjacent to the conduit 134) of the inner surface 190 at a suitable velocity to efficiently cool an area near the edge 192. Accordingly, it may be desirable to orient a portion 196 of the impingement openings 182 at an angle relative to the axial axis 76 (e.g., acutely angled at 10, 20, 30, 40, 50, 60, 70, or 80 degrees), as discussed in further detail below.

Figure 7:
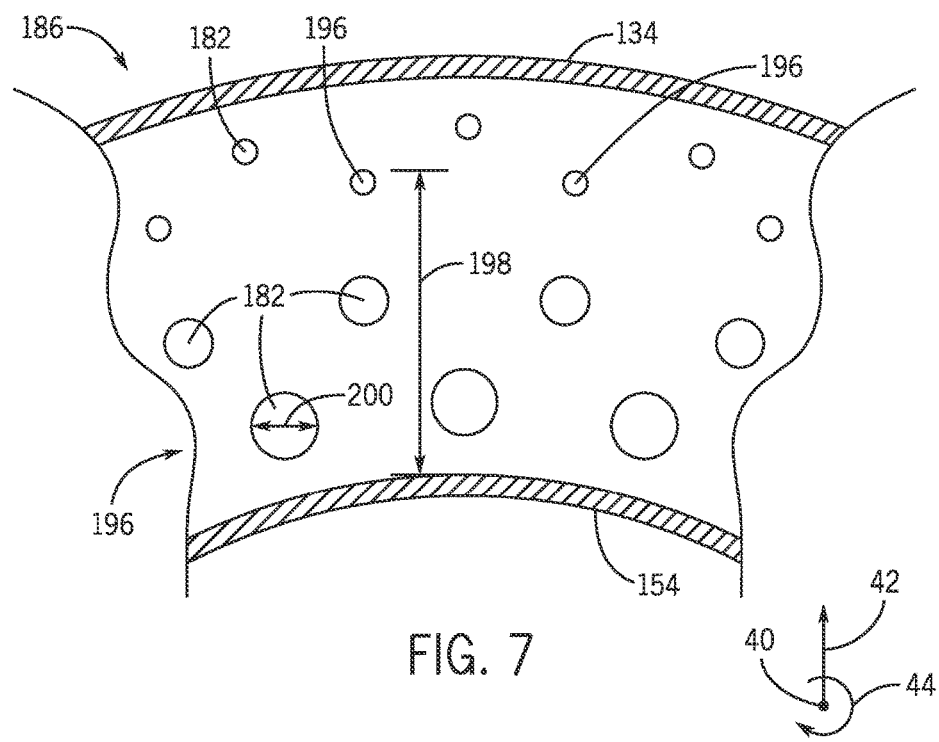
FIG. 7 is a tip view of an embodiment of a perforated plate of the center body, wherein the perforated plate includes a plurality of impingement openings.

FIG. 7 illustrates a top view of a portion of the perforated cooling plate 186 having a plurality of the impingement openings 182, 196 (e.g., greater than or equal to 1, 2, 3, 4, 5, 6, 7, 8, 9, 10, 15, 20, 50, or more) circumferentially 44 spaced about the axial axis 76 at different radial and circumferential positions along the plate 186. To facilitate cooling of the edge 192, the impingement openings 196 may be disposed a radial distance 198 away from the wall 154. The impingement openings 196 are oriented in a direction toward the conduit 134 (e.g., acutely angled outwardly relative to the axis 76). As such, the impingement openings 196 may direct the cooling fluid 148 toward the edge 192, thereby reaching the inner surface 190 in areas near the edge 192 at a suitable velocity for efficient impingement cooling. In certain embodiments, a diameter 200 of the impingement openings 182, 196 may decrease with respect to a diameter 200 of an adjacent opening 192, 196 in a radial direction 42 away from the axial axis 76. For example, the impingement openings 182 adjacent to the conduit 154 may have a larger diameter 200 compared to the diameter 200 of the impingement openings 182, 196 adjacent to the conduit 134. In certain embodiments, the diameter 200 of the impingement openings 182 adjacent to the conduit 154 may be 1.1 to 5, 1.2 to 4, 1.2 to 3, 1.4 to 2 times greater than the diameter 200 of the impingement openings 182, 196 adjacent to the conduit 134. This may be due, in part to a temperature gradient across the inner wall 190 during combustion of the fuel-air mixture in the combustion region 46. For example, the temperature of the inner wall 190 may increase radially outward 42 away from the center axis 76 due to a position of the primary flame. Therefore, because impingement cooling efficiency is associated with impingement velocity of the cooling fluid 148, the impingement velocity of the cooling fluid 148 cooling an area of the inner surface 190 near the conduit 134 (e.g., an area of the inner surface 190 furthest away from the axis 76 in the radial direction 42) may be higher compared to the impingement velocity of the cooling fluid 148 cooling an area of the inner surface 190 near the conduit 154 (e.g., an area of the inner surface 190 closest to the axis 76 in the radial direction 42).

Figure 8:
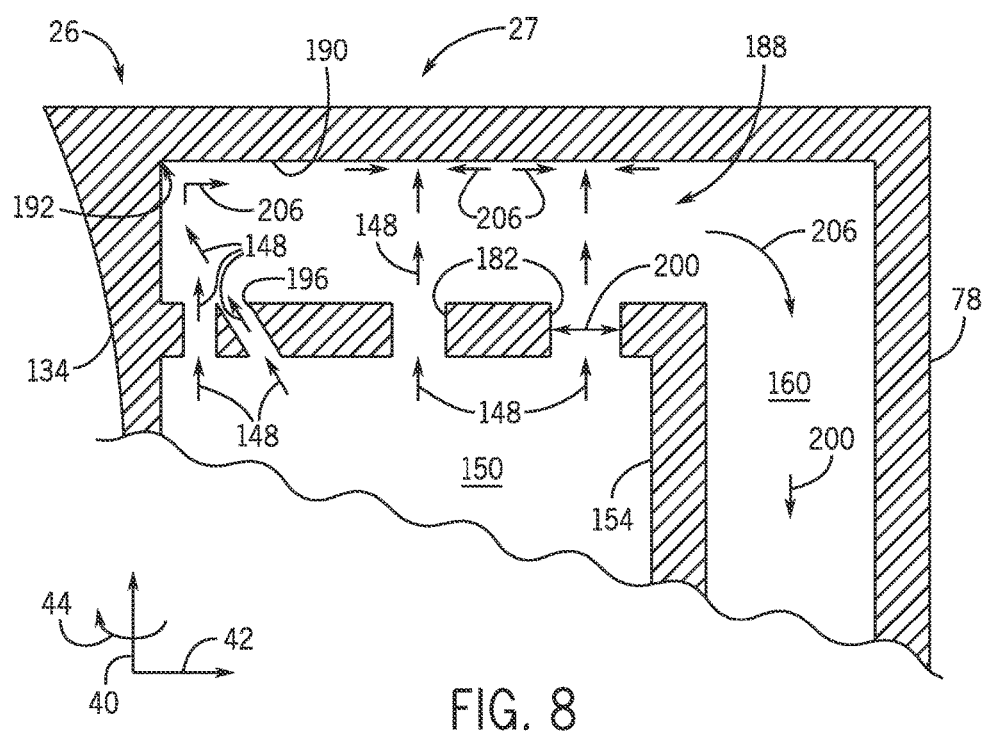
FIG. 8 is a cross-sectional view of an embodiment of a downstream end portion of the center body, wherein the center body includes the perforated plate upstream of a cooling chamber fluidly coupling the tip cooling passage and the coolant recovery passage, and the tip cooling passage flows the cooling fluid flows toward the downstream direction and the coolant recovery passage flows the cooling fluid in an upstream direction.

FIG. 8 illustrates a portion of the center body 26 at the downstream end portion 27 of the fuel nozzle assembly 20. As discussed above, the cooling fluid 148 flows into the cooling chamber 188 (e.g., radial passage) through the impingement openings 182, 196 and impinges on the inner surface 190, thereby cooling the center body 26 at the downstream end portion 27 of the fuel nozzle assembly 20. After impingement on the inner surface 190, the cooling fluid 148 (now heated fluid 206) flowing within the cooling chamber 188 changes flow directions. For example, the heated fluid 206 may flow in a radial direction 42 toward the axis 76 and into the passage 160 (e.g., between conduits 78 and 154). While in the passage 160, the heated fluid 206 flows in an upstream axial direction 40 between the conduits 78 and 154. That is, the heated fluid 206 flows in a direction opposite from a flow direction of the cooling fluid 148 in the passage 150 (e.g., between the conduits 134 and 154). As illustrated in FIG. 3, the passage 160 directs the heated fluid 206 upstream towards the first mixing region 96, where the heated fluid 206 exits the passage 160 via the one or more radial openings 108 (e.g., 1 to 100) through the conduit 78 (e.g., annular wall of center pilot 80) within the first mixing region 96. The openings 108 are within the mixing region 96, and are fluidly coupled to the vanes 112 (e.g., spaced between the vanes 112). As such, the heated fluid 206 may flow into the mixing region 96 and mix with the fuel 22 and the air 24 from the passages 92, 94. A plurality of the radial openings 108 (e.g., greater than or equal to 1, 2, 3, 4, 5, 6, 7, 8, 9, 10, 15, 20, 50, or more) may be circumferentially 44 spaced about the axial axis 76 at different axial and circumferential positions along the conduit 78, and the radial openings 108 may be oriented at different angles relative to the axial axis 76 (e.g., perpendicular or acutely angled at 10, 20, 30, 40, 50, 60, 70, or 80 degrees). The heated fluid 206 flows between the vanes 106 and mixes with the fuel 22 and the air 24 exiting the fuel injector 90 in the first mixing region 96. In this way, the heated fluid 206 (e.g., the pressurized air 24) may be recovered and used to generate the fuel and air mixture in the mixing region 96, thereby mitigating flame destabilization resulting from changes in fuel/air ratios and pressure fluctuations across the downstream end portion 27 generally associated with fuel nozzle assemblies that discharge the cooling fluid directly into the combustion region 46. Additionally, recovering and using the fluid 148, 206 to generate the fuel-air mixture in the mixing region 96 may decrease emissions associated with unstable flames.

Figure 9:
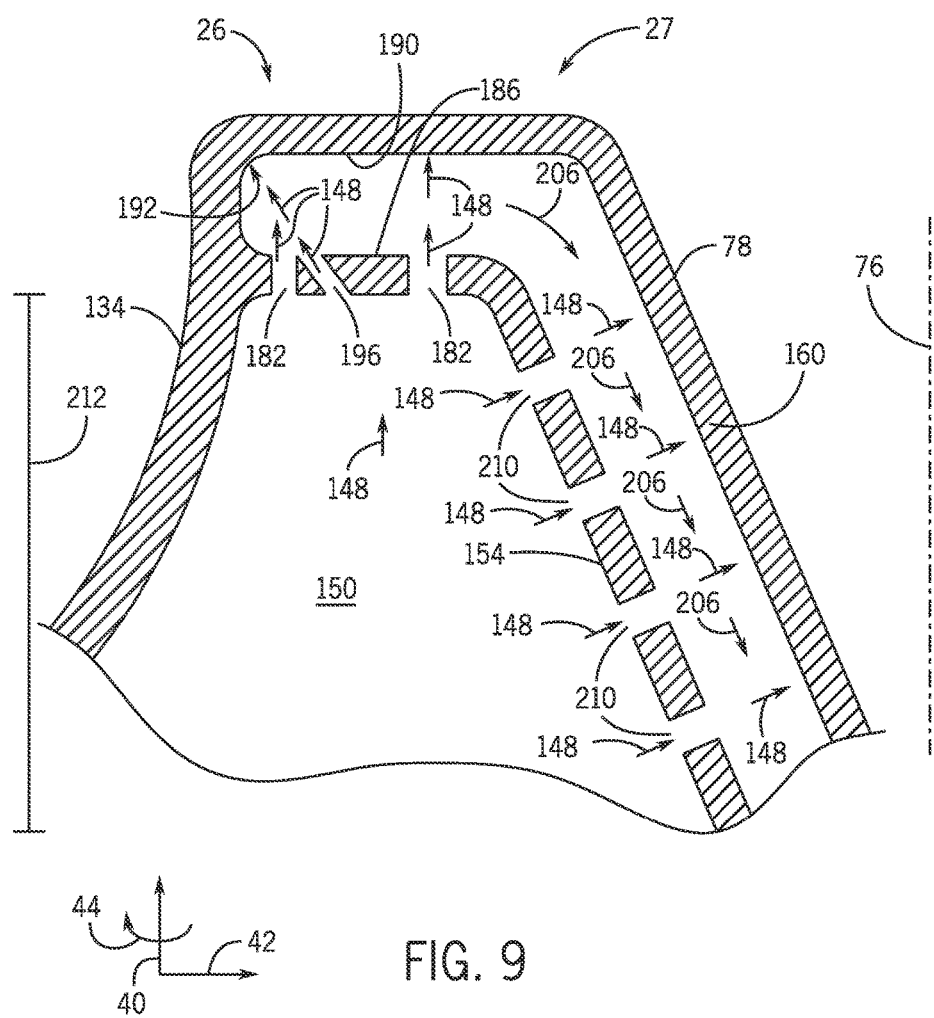
FIG. 9 is a cross-sectional view of an embodiment of a downstream end portion of the center body, wherein a wall defining both the tip cooling passage and the coolant recovery passage includes a plurality of openings upstream of the perforated plate.

In certain embodiments, the conduit 154 may include openings disposed along a portion of the conduit 154. For example, FIG. 9 illustrates openings 210 axially 40 spaced apart along at least a portion of a length of the conduit 154. The openings 210 may also extend circumferentially 44 about the axial axis 76 at different axial positions along the conduit 154, and may be oriented at an angle relative to the radial axis 42 (e.g., perpendicular or acutely angled at 10, 20, 30, 40, 50, 60, 70, or 80 degrees). For example, in certain embodiments, the openings 212 may be oriented away from the radial axis 42 toward the downstream end portion 27. In other embodiments, the openings 210 may be oriented away from the radial axis 42 toward the upstream end portion 138. The openings 210 may direct at least a portion of the cooling fluid 148 into the passage 160 upstream of the perforated plate 186. The cooling fluid 148 may mix with the heated fluid 206 in the passage 160, thereby decreasing a temperature of the fluid 206 before mixing with the fuel 22 in the mixing region 96. In addition, similar to the openings 182, 196, the openings 210 may provide impingement cooling of the conduit 78.

As discussed above, certain embodiments of the fuel nozzle assembly 20 include a cooling fluid recovery passage that directs the cooling fluid to a mixing region after cooling. The recovered cooling fluid is used to generate a portion of the fuel-air mixture supplied to the combustion region via a center pilot, thereby facilitating flame stabilization in the reaction zone (e.g., combustion region) of the combustor 14. The fuel nozzle assembly 20 includes the center body 26 having the tip cooling passage 150 fluidly coupled to the cooling fluid recovery passage 160. The cooling passage 150 directs the cooling fluid 148 (e.g., the air 24) to the cooling chamber 188 via impingement openings 182, 196 disposed on the perforated plate 186. The impingement openings 182, 196 increase a flow velocity of the cooling fluid 148 to facilitate impingement cooling on the inner surface 190 at the downstream end portion 27. The impingement openings 196 may be oriented at an angle relative to the centerline axis 76 of the fuel nozzle assembly 20 to facilitate impingement cooling on certain areas of the inner surface 190 that may not be accessible to the axial flow of the cooling fluid 148. The cooling chamber 188 is fluidly coupled to the passages 150, 160, and enables recovery of the heated cooling fluid (e.g., the heated fluid 206). The passage 160 directs the heated fluid 206 to the vanes 106 (e.g., a swirler), which facilitate mixing of the fuel 22, the heated fluid 206, and the air 24 from the passage 92, 94. In this way, fluctuations in fuel/air ratios and pressures and temperatures across the downstream end portion 27 generally associated with cooling fluid discharged directly into the combustion region may be mitigated. Accordingly, flame stabilization and combustion efficiency of the system 10 may be increased, and combustion emissions and operational/maintenance costs may be decreased compared to fuel nozzle assemblies that do not recover and use the cooling fluid to generate the fuel-air mixture.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A gas turbine system, comprising:
a fuel nozzle, comprising:
a first body comprising:
a central passage extending from a mixing region to a central outlet at a first downstream end portion of the first body, wherein the central passage is defined by a first annular wall, and wherein the first annular wall radially diverges relative to a central axis of the central passage in a downstream direction toward the first downstream end portion;
an annular pilot fuel outlet extending axially from an upstream end portion of the first body into the mixing region, wherein the annular pilot fuel outlet is oriented parallel to the central axis and surrounds a central pilot fuel passage configured to deliver air and fuel into the mixing region;
an oxidant outlet in the mixing region; and
an outer passage comprising a first passage extending in the downstream direction toward the first downstream end portion and a second passage extending in an upstream direction from the first downstream end portion into the mixing region, wherein the second passage radially diverges relative to the central axis in the upstream direction such that a first radial dimension of the second passage adjacent to the first downstream end portion is smaller than a second radial dimension of the second passage adjacent to the mixing region, and wherein the fuel nozzle is configured to flow a fluid through the first passage, the second passage, the oxidant outlet, and into the mixing region.

2. The gas turbine system of claim 1, wherein the mixing region comprises a plurality of vanes.

3. The gas turbine system of claim 2, wherein the plurality of vanes comprises a plurality of swirl vanes.

4. The gas turbine system of claim 2, wherein the plurality of vanes define a plurality of radial passages extending inwardly into the central passage.

5. The gas turbine system of claim 2, wherein the plurality of vanes are disposed about a portion of the mixing region.

6. The gas turbine system of claim 1, wherein the second passage comprises the oxidant outlet.

7. The gas turbine system of claim 1, wherein the first and second passages are concentric annular passages.

8. The gas turbine system of claim 1, wherein the first body comprises a plurality of radial passages extending between the first and second passages.

9. The gas turbine system of claim 1, wherein the outer passage comprises a cooling chamber disposed adjacent the first downstream end portion.

10. The gas turbine system of claim 9, comprising an impingement plate having a plurality of impingement ports, wherein the cooling chamber is disposed between the impingement plate and the first downstream end portion.

11. The gas turbine system of claim 1, wherein the first body comprises the first annular wall disposed about the central passage and a second wall disposed about the first annular wall, the first and second passages are disposed on opposite sides of the second wall, and the second wall comprises a plurality of impingement ports.

12. The gas turbine system of claim 1, wherein the outer passage comprises a radial outlet, an axial inlet, or a combination thereof.

13. The gas turbine system of claim 1, comprising a second body disposed about the first body, wherein the second body comprises a fluid passage extending to a second downstream end portion of the second body.

14. The gas turbine system of claim 13, wherein the fluid passage comprises a plurality of swirl vanes, at least one oxidant port, and at least one fuel port.

15. The gas turbine system of claim 1, comprising a gas turbine combustor, or a gas turbine engine, or a combination thereof, having the fuel nozzle.

16. The gas turbine system of claim 1, wherein the outer passage comprises a radial wall disposed between the first and second passages and extending from the first annular wall to a second annular wall, wherein the second annular wall circumferentially surrounds the first annular wall and defines at least a portion of the first passage, wherein the radial wall does not have openings and is configured to block the fluid from exiting the outer passage at the first downstream end portion and to change a flow direction of the fluid in the first passage from a first direction to a second direction that is substantially opposite from the first direction to direct the fluid into the second passage.

17. The gas turbine system of claim 1, wherein the mixing region circumscribes the annular pilot fuel outlet.

18. A gas turbine system, comprising:
a fuel nozzle, comprising:
a first body comprising:
a fuel outlet extending from an upstream end portion of the first body into a mixing region, wherein the mixing region circumscribes the fuel outlet;
a central passage extending from the mixing region to a central outlet at a first downstream end portion of the first body, wherein the central passage is defined by a first annular wall, and wherein the first annular wall radially converges relative to a central axis of the central passage at an outlet of the mixing region, forming a throat, and radially diverges relative to the central axis in a downstream direction from the throat to the first downstream end portion;
a plurality of swirl vanes disposed in the mixing region;
an outer passage comprising a first passage extending in the downstream direction toward the first downstream end portion and a second passage extending in an upstream direction from the first downstream end portion into the mixing region, wherein the fuel nozzle is configured to flow a fluid through the first passage, the second passage, an oxidant outlet, and into the mixing region, wherein the second passage radially diverges relative to the central axis in the upstream direction from the first downstream end portion to the mixing region such that a first radial dimension of the second passage adjacent to the first downstream end portion is smaller than a second radial dimension of the second passage adjacent to the mixing region; and
a second body disposed about the first body, wherein the second body comprises a fluid passage extending to a second downstream end portion of the second body.

19. The gas turbine system of claim 18, wherein the fluid passage comprises a second plurality of swirl vanes, at least one oxidant port, and at least one fuel port.

20. The gas turbine system of claim 18, wherein the fluid passage comprises a second mixing region adjacent to the second downstream end portion.

21. The gas turbine system of claim 18, wherein the first passage circumferentially surrounds the second passage and the central passage, and wherein the second passage circumferentially surrounds the central passage.

22. The gas turbine system of claim 18, wherein the outer passage comprises a radial wall disposed between the first and second passages and extending from the first annular wall to a second annular wall, wherein the second annular wall circumferentially surrounds the first annular wall and defines at least a portion of the first passage, wherein the radial wall does not have openings and is configured to block the fluid from exiting the outer passage at the first downstream end portion and to change a flow direction of the fluid in the first passage from a first direction to a second direction that is substantially opposite from the first direction to direct the fluid into the second passage.

23. The gas turbine system of claim 18, wherein the fuel outlet extends axially from the upstream end portion of the first body, and wherein the fuel outlet is oriented parallel to the central axis of the central passage.

* * * * *